United States Patent
Bhadri et al.

(10) Patent No.: US 8,521,873 B2
(45) Date of Patent: Aug. 27, 2013

(54) SYSTEM AND METHOD OF EMULATING A NETWORK CONTROLLER WITHIN AN INFORMATION HANDLING SYSTEM

(71) Applicant: Dell Products, LP, Round Rock, TX (US)

(72) Inventors: Santosh Bhadri, Karnataka (IN); Timothy M. Lambert, Austin, TX (US); Alaa Yousif, Round Rock, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

(21) Appl. No.: 13/687,555

(22) Filed: Nov. 28, 2012

(65) Prior Publication Data

US 2013/0086262 A1     Apr. 4, 2013

Related U.S. Application Data

(63) Continuation of application No. 11/872,400, filed on Oct. 15, 2007, now Pat. No. 8,346,912.

(51) Int. Cl.
*G06F 15/173* (2006.01)

(52) U.S. Cl.
USPC .................. 709/224; 709/222; 709/223

(58) Field of Classification Search
None
See application file for complete search history.

(56) References Cited

U.S. PATENT DOCUMENTS

| | | | |
|---|---|---|---|
| H001898 H | 10/2000 | Doughty et al. | |
| 6,560,641 B1 | 5/2003 | Powderly et al. | |
| 7,197,660 B1 | 3/2007 | Liu et al. | |
| 7,231,430 B2 | 6/2007 | Brownell et al. | |
| 7,281,030 B1* | 10/2007 | Davis | 709/212 |
| 2004/0049624 A1* | 3/2004 | Salmonsen | 710/306 |
| 2005/0086494 A1 | 4/2005 | Carley et al. | |
| 2006/0168274 A1* | 7/2006 | Aloni et al. | 709/230 |
| 2007/0104189 A1* | 5/2007 | Hsu et al. | 370/389 |
| 2007/0237084 A1 | 10/2007 | Rothman et al. | |
| 2009/0100194 A1 | 4/2009 | Bhadri et al. | |

* cited by examiner

*Primary Examiner* — Firmin Backer
*Assistant Examiner* — Keyvan Emdadi
(74) *Attorney, Agent, or Firm* — Larson Newman, LLP

(57) ABSTRACT

A system and method of emulating a network controller within an information handling system is disclosed. In one form, an information handling system can include a host chipset operably coupled to a network interface controller of a first main circuit board, and a management controller operably coupled to the host chipset. The information handling system can also include an emulated network interface controller operable to be activated by the management controller. The information handling system can further include a communication bus coupled to the host chipset and the management controller. In one form, the communication bus is operable to activate a communication link between the host chipset and the emulated network interface controller.

20 Claims, 4 Drawing Sheets

SYSTEM AND METHOD OF EMULATING A NETWORK CONTROLLER WITHIN AN INFORMATION HANDLING SYSTEM

CROSS REFERENCE TO RELATED APPLICATIONS

This application is a continuation of U.S. patent application Ser. No. 11/872,400, entitled "System and Method of Emulating a network Controller within an Information Handling System," filed on Oct. 15, 2007, the disclosure of which is hereby expressly incorporated by reference in its entirety.

FIELD OF THE DISCLOSURE

This disclosure relates generally to information handling systems, and more particularly to a system and method of emulating a network interface within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
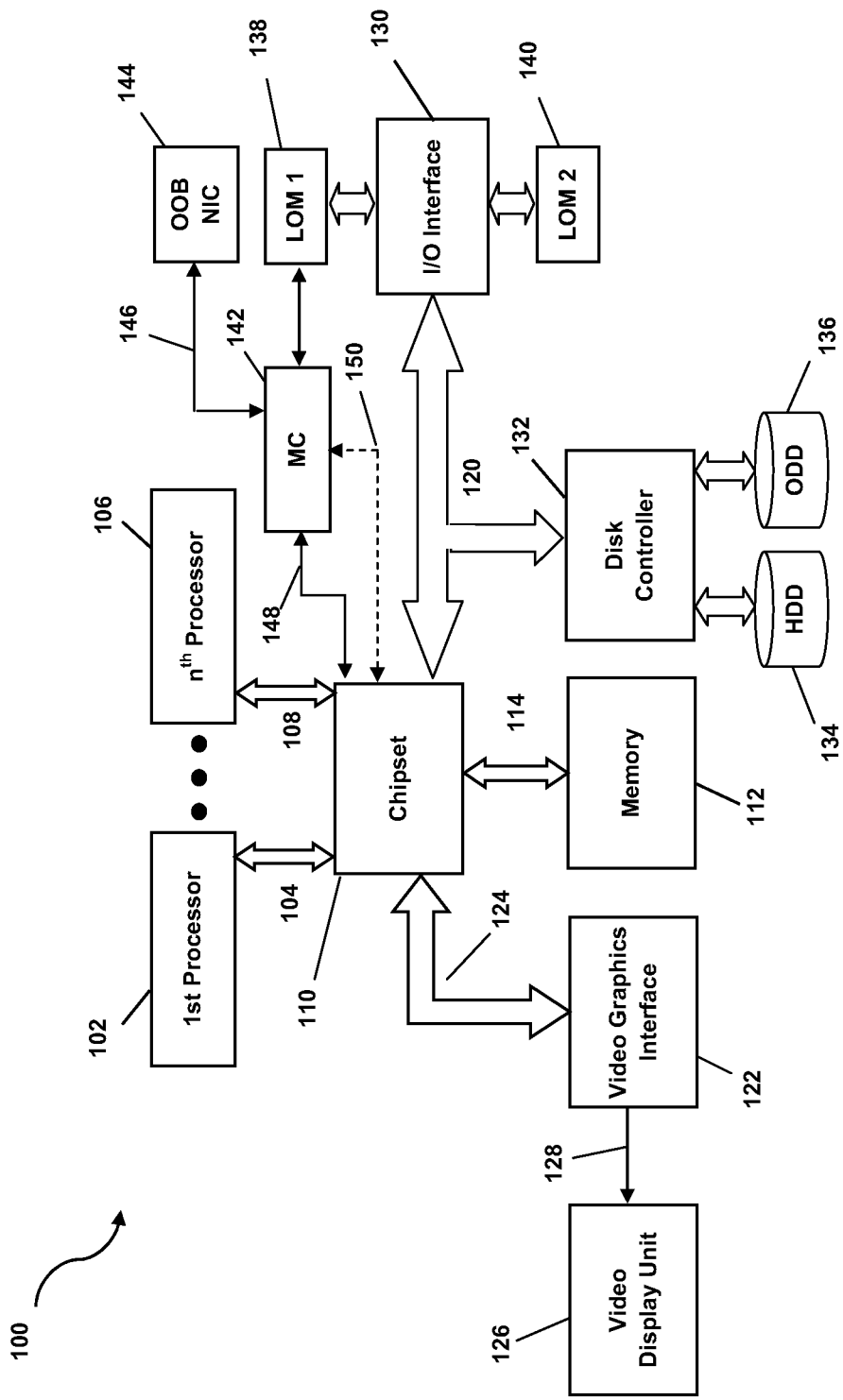
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, an information handling system is disclosed. The information handling system can include a host chipset operably coupled to a network interface controller of a first main circuit board, and a management controller operably coupled to the host chipset. The information handling system can also include an emulated network interface controller operable to be activated by the management controller. The information handling system can further include a communication bus coupled to the host chipset and the management controller. In one form, the communication bus is operable to activate a communication link between the host chipset and the emulated network interface controller.

According to another aspect of the disclosure, a method of enabling communication within an information handling system is disclosed. The method can include emulating a network interface controller using a management controller, and receiving a network communication using the emulated network interface controller. The method can further include determining an available communication bus between a host chipset and the management controller, and initiating activation of a communication interface using the available communication bus. The method can also include enabling communication of network traffic between the host chipset and the management controller using the emulated interface controller and the available communication bus.

According to a further aspect of the disclosure, an information handling system can include a host chipset operably coupled to a management controller of a first main circuit board, and an emulated network interface controller operable to be activated by the management controller. The information handling system can also include a communication bus coupled to the host chipset and the management controller. In one form, the communication bus can be operable to activate a communication link between the host chipset and the emulated network interface controller. The information handling system can also include a first local area network interface controller coupled to the management controller and the host chipset, and a second local area network interface controller coupled to the management controller and the host chipset. In one form, the emulated network interface controller can further be operable to communicate network traffic received by the first local area network interface controller and the second local area network interface controller to the host chipset.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to display content within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer System Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In one form, the information handling system 100 can include a first local area network on motherboard interface controller (LOM 1) 138 and a second local area network on motherboard interface controller (LOM 2) 140 coupled to the I/O interface 130. The LOM 1 138 and the LOM 2 140 can be coupled using a PCI enabled communication bus, or other communication bus, operable to be coupled to the I/O interface 130. The LOM 1 138 can also be coupled to a management controller (MC) 142. In one form, the MC 142 can be coupled to an out-of-band network interface controller (OOB NIC) 144 operable to communicate out-of-band network traffic. For example, out-of-band network traffic can include system administrator traffic used to access the MC 142, and in one form, can be established using a private network, secure connection, or any combination thereof. The OOB NIC 144 can include various types of communication modules, and in one form can include an Ethernet communication module. According to one aspect, the OOB NIC 144 can be isolated from the LOM 1 138 and LOM 2 140, and network traffic may not typically be shared between the OOB NIC 144 and other communication modules of the information handling system 100.

According to one aspect, the MC 142 can be coupled to the chipset 110 using a proprietary link 148 to the information handling system 100. In one form, the proprietary link 148 can work with the OOB NIC 144 to access the chipset 110 and various resources of the information handling system 142. In one form, the MC 142 can also employ an emulated network interface controller (not illustrated) and an emulated communication link 150 between the MC 142 and the chipset 110. For example, the emulated communication link 150 can be employed using a plug-and-play communication bus, a low-pin count (LPC) communication bus, of the information handling system 100. For example, a plug-and-play communication bus can include a USB version 2.0, or other plug-and-play communication bus, or any other type of communication bus that can establish a communication link with a device or between locations without having to reinitialize the information handling system 100. In one form, the emulated communication link 150 can be provided as a part of the communication bus 120. As such, the MC 142 can be coupled to the emulated communication link 150 to enable communication of data or information within the information handling system 100 as desired.

During use, the MC 142 employing the emulated communication link 150 can communicate in-band traffic and out-of-band traffic between the chipset 110 and the MC 142. For example, the LOM 1 138 can receive network traffic and can couple the network traffic to the MC 142 employing the emulated communication link 150. Though not illustrated, the LOM 2 140 can also be coupled to the MC 142 to receive network traffic as desired. For example, in one form, the LOM 2 140 can be used as failover resource in the event LOM 1 138 or another network communication device fails or experiences excessive network traffic.

According to one aspect, out-of-band network traffic can include traffic intended to be communicated to the MC 142. In another form, in-band network traffic includes traffic intended to be communicated to the information handling system 100 and subsequent applications other than MC 142 based applications. In some forms, combinations of in-band and out-of-band network traffic can be presented to one or more network communication device of the information handling system 100.

In one form, the MC 142 can filter the out-of-band network traffic (if present) from the in-band network traffic and couple the in-band traffic to the chipset 110 accordingly. For example, the MC 142 can discriminate address information including destination information, source information, or various other types of information, to determine a type of network traffic. In this manner, the emulated communication link 150 can couple the in-band network traffic to the chipset 110 as desired, and can further provide additional resources to communicate network traffic within the information handling system 100.

According to another aspect, the MC 142 employing the emulated communication link 150 can receive in-band network traffic from the chipset 110 using the emulated communication link 150. The MC 142 can communicate the in-band network traffic to the LOM 1 138 to output as desired. In another form, the MC 142 can receive in-band and out-of-band network traffic, and can be operable to output accordingly. For example, the MC 142 can couple the out-of-band network traffic to the OOB NIC 144 using the proprietary link 146, and can further couple the in-band network traffic to the LOM 1 138 to output the in-band network traffic.

According to a further aspect, the information handling system 100 using a MC 142 operable to use the emulated communication link 150 can be accessed externally through a public network to determine various operating conditions of the information handling system 100. For example, the MC 142 can be operable to report operating condition of the information handling system 100, update software, firmware, drivers, etc. using a software or firmware update process, access environmental operating conditions such as power consumption, fan utilization, or other environmental data, access error logs or other data, enable Telnet or other external access activities, or various other management or system management activities. As such, the information handling system 100 employing the MC 142 operable to output the emulated communication link 150 can employ using network traffic received via the LOM 1 138 to the MC 142 without having to use the OOB NIC 144. For example, in certain operating conditions, the OOB NIC 144, associated network, or any combination thereof, may be inoperable or out of service. As such, the MC 142 can be accessed using via the LOM 1 138 and associated network to access and service the information handling system 100 as needed or desired.

Figure 2:
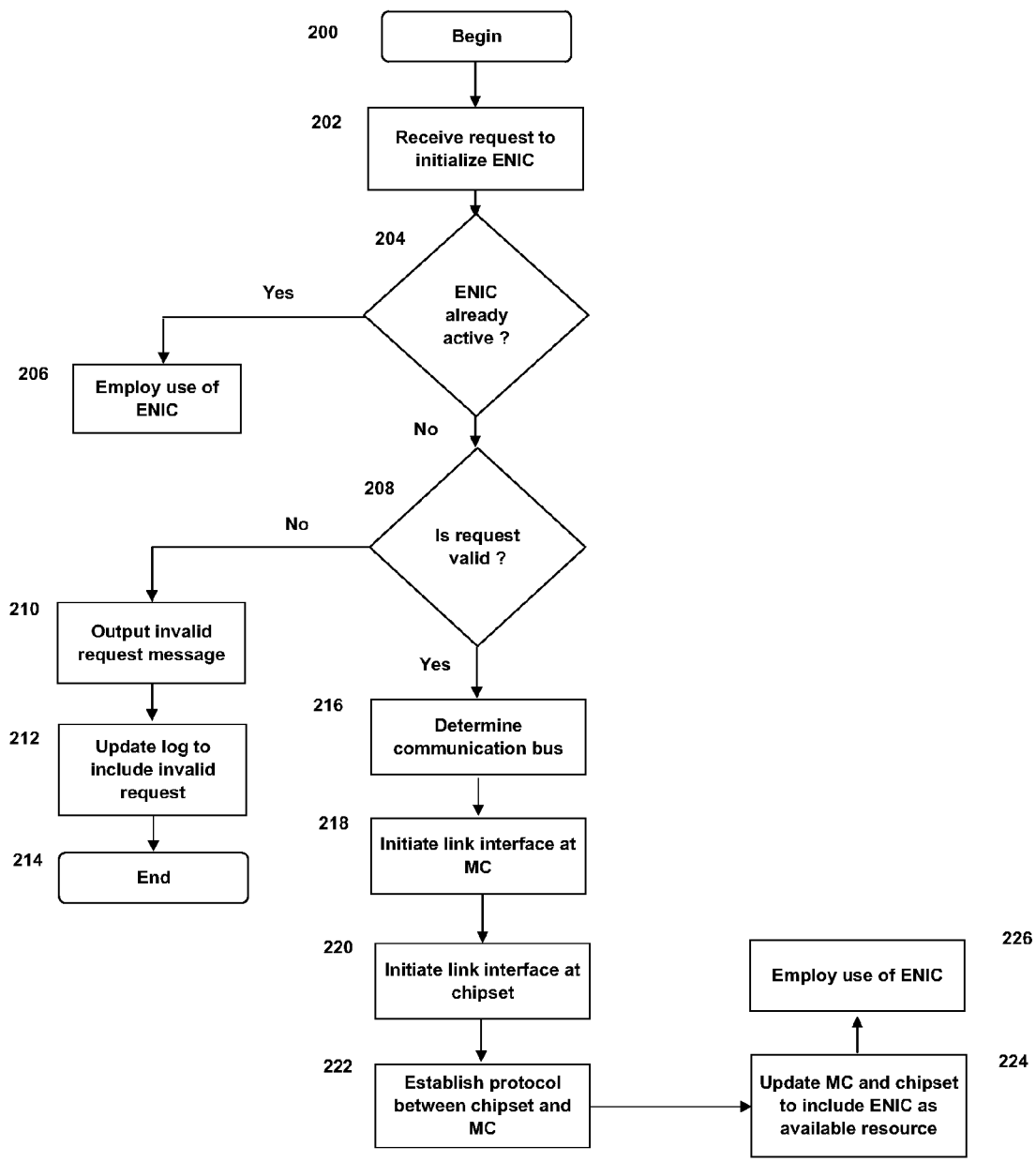
FIG. 2 illustrates a flow diagram of a method of emulating a network interface controller within an information handling system according to one aspect of the disclosure.

FIG. 2 illustrates a flow diagram of a method of emulating a network interface controller within an information handling system according to one aspect of the disclosure. FIG. 2 can be employed in whole, or in part, by the information handling system 100 depicted in FIG. 1, the information handling system 300 described in FIG. 3, or any other type of system, controller, device, module, processor, or any combination thereof, operable to employ all, or portions of, the method of FIG. 2. Additionally, the method can be embodied in various types of encoded logic including software, firmware, hardware, or other forms of digital storage mediums, computer readable mediums, or logic, or any combination thereof, operable to provide all, or portions, of the method of FIG. 2.

The method begins generally at block 200. At block 202 a request to initialize an emulated network interface controller (ENIC) can be received. In one form, a request can be received at a management controller of an information handling system. For example, a request to initialize the ENIC can be initiated by a host system operable to initiate a request to use an ENIC. However, in other forms, a request to enable the ENIC can originate external to the host system. For example, a user accessing a host system via a web interface can request to enable an ENIC. A web interface can include a selectable element operable to enable activation of the ENIC. In other forms, a user can enter a command line input or CLI command via a CLI interface to initiate use of the ENIC. In another form, a user can activate the ENIC using a web interface to a management controller of the information handling system. For example, if the information handling system fails, a primary network interface controller fails, or other type of undesirable condition, a user can access a management controller or a DRAC using a web interface and enable the ENIC to restore network communication.

Upon receiving a request to initialize the ENIC, the method can proceed to decision block 204, and can determine if the ENIC may be already active. If the ENIC is already active the method can proceed to block 206, and use of the ENIC can be employed. If at decision block 204 the ENIC may not be enabled, the method can proceed to decision block 208, and can determine of the request to enable the ENIC is valid. For example, a user name, password, etc. can be authenticated, and at decision block 208, if the request is invalid, the method can proceed to block 210, and a message can be output indicating that the request to activate the ENIC could not be authenticated. The method can then proceed to block 212 and a log can be updated to include a reference to the invalid request. The method can then proceed to block 214 and end.

In one form, if at decision block 208 the request to enable the ENIC can be validated, the method can proceed to block 216 and a communication bus can be determined to be used with the ENIC. For example, a communication bus can include a USB 2.0 enabled communication bus operable to enable connection of one or more types of USB devices and in one form, a virtualized or emulated USB device can be employed using the USB enabled communication bus. Upon determining a communication bus that can be used with the ENIC, the method can proceed to block 218 and an emulated network interface controller can be initiated at the management controller. For example, the management controller can include a USB communication bus that can employ an emulated or virtualized communication device, such as an emulated network interface controller, operable to establish a communication link. The method can then proceed to block 220, and the host chipset can initiate a communication link with the ENIC to enable access along the USB communication bus.

Upon initiating a communication link, the method can proceed to block 222 and a protocol can be established between the host chipset and the MC using the ENIC communication link. The method can then proceed to block 224, and the MC and host chipset can be updated to include the ENIC communication link as an available resource to communicate network traffic. The method can then proceed to block 226 and use of the ENIC can be employed.

Figure 3:
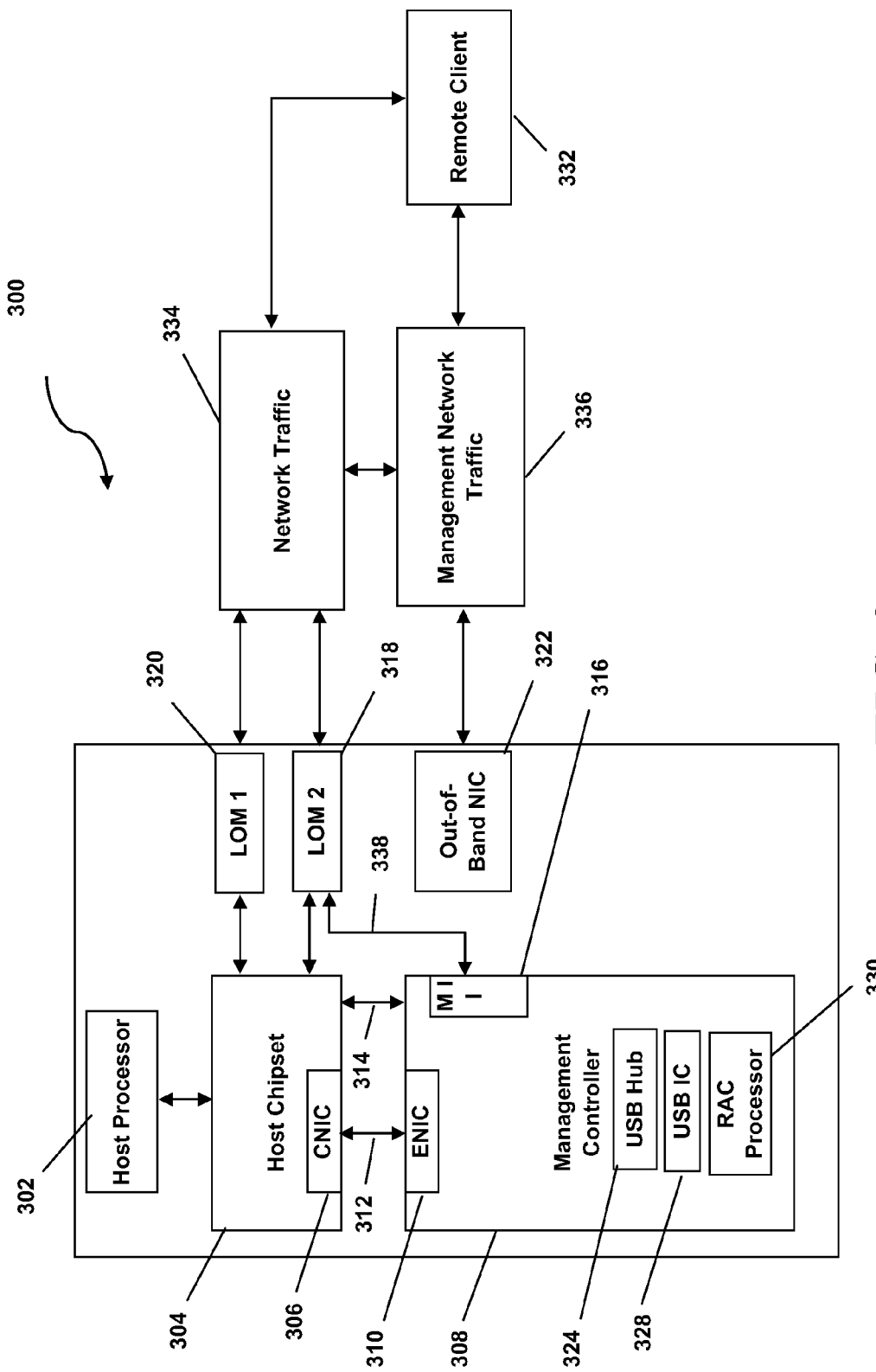
FIG. 3 illustrates a functional block diagram of an information handling system employing a management controller and emulated network interface controller according to one aspect of the disclosure.

FIG. 3 illustrates a functional block diagram of an information handling system, illustrated generally as 300, employing an emulated network interface controller. The information handling system 300 can include a host processor 302, a host chipset 304, and chipset network interface controller (CNIC) 306, a management controller 308, and an emulated network interface controller 310. The CNIC 306 and the ENIC 310 can be operable to establish a network link 312. In one form, the information handling system 300 can include a proprietary link 314 that can be established between the host chipset 304 and the management controller 308. The management controller 308 can also include a media independent interface (MII) 316 to access a second LOM 2 318 using an MII link 338, a first LOM 1 320, various other LOMs (not illustrated), or any combination thereof. The first LOM 1 320 can be coupled to the host chipset 304. The management controller 308 can also be coupled to an out-of-band NIC 322 operable to receive out-of-band network traffic. In one form, the out-of-band NIC 322 can be integrated as a part of the management controller 330. In one form, the first LOM 1 320 and the second LOM 2 318 can be coupled to the MII 316 using the MII link 338.

According to one aspect, the information handling system 300 can include a USB 2.0 hub 324 operable to route traffic, a USB 2.0 integrated circuit (IC) 328, and a remote access controller (RAC) processor 330. In one form, the RAC processor 330 can be provided as a part of the management controller 308. In another form, the LOM 1 320 and the LOM 2 318 can be coupled to a remote management client 332 that can communicate network traffic 334 which can include in-band traffic, out-of-band network traffic, or any combination thereof. In one form, out-of-band network traffic such as management network traffic 336 can be directly coupled to the out-of-band NIC 322.

According to one aspect, the information handling system 300 can include a remote access card incorporating one or more components of the information handling system 300. For example, a remote access controller card can be used within a server and can enable remote access to a server or host system to manage remotely. For example, portions of the information handling system 300 can be incorporated as a remote access card such as a Dell® Remote Access Card (DRAC). A DRAC can include an independent out-of-band management card including an independent processor with embedded OS, NIC, web-server, telnet interface, serial interface, and an embedded memory file system. The DRAC can operate using auxiliary power when available, without having all or a majority of the information handling system 300 powered up.

According to one aspect, the DRAC can function to enable server power-on/off/cycle, server reset, and can be used to view server hardware sensors (e.g. temperature and voltage) and hardware error logs, enable graphics console redirect by obtaining video from a DVI output, compresses graphics changes, and displays on a remote browser across the network, control COM1 serial redirection to a browser, telnet, or other serial interface, to enable Virtual Media such as a remote CD and floppy drive, and other support that can allow a remote user to use a remote CD/floppy to boot the server, install apps, install new operating systems, etc. without physically accessing the information handling system 300.

In one form, the management controller 308 can include a baseboard management controller (BMC) integrated circuit. The BMC can be used in a system used within a system employing a DRAC, or can be used within a system that may not employ the DRAC. In one form, the BMC can employ a portion, or all of, the functionality of the DRAC. For example, the BMC can reside within the information handling system 300, and can be used as an interface to the host chipset 304 during system management. For example, a BMC can appear as a single IP address and all other traffic can proxy through the BMC to the external network. The BMC can filter and proxy network traffic through an emulated interface of the BMC as desired. The BMC can further be provided external to the DRAC and can be coupled to the first LOM 320, the second LOM 318, or any combination thereof. For example, the first LOM 320 can be used to access system management features using a network connection to the BMC. Additionally, the BMC can be coupled to the DRAC using an Intelligent Platform Management Interface (IPMI) link to communicate with the DRAC.

In one form, the first LOM 320, the second LOM 318, or any combination thereof, can be used by the management controller 308 as a network sharing NIC or as a failover NIC. For example, the management controller 308 can employ the MII 316 in the event of failover, or to facilitate load balancing during high volume network traffic conditions. In one form, the management controller 308 can receive both in-band and out-of-band network traffic in the event a network interface card or device fails. The management controller 308 can initiate using the ENIC 310 and can couple in-band network traffic from the management controller 308 to the host chipset 304. The management controller 308 can further receive out-of-band network traffic and process as needed or desired.

According to one aspect, the out-of-band NIC 322 can include an Ethernet port having an RJ-45 connector or other type of connector to couple a network cable. In one form, the USB 2.0 hub 324 can be operably coupled to the management controller 308 and, in one form, can be used in association with outputting virtual devices such as a virtual floppy drive, a virtual CD ROM, or various other virtual devices that can be virtualized. The USB hub 324 can be used with the USB IC 328 and can include USB logic.

In another form, the out-of-band NIC 322 can be realized as an emulated device to enable network access. For example, the management controller 308 can include the out-of-band NIC 322 and can establish the link 312 between the host chipset 304 and the management controller 308 to provide the host chipset 304 access to the out-of-band NIC 322. In one form, if the first LOM 1 320 and the second LOM 2 318 fail or cannot be accessed by the host chipset 304, the host chipset 304 can access the network using the out-of-band NIC 322 through link 312. In this manner, the information handling system 300 can be accessed via the out-of-band NIC 322.

Figure 4:
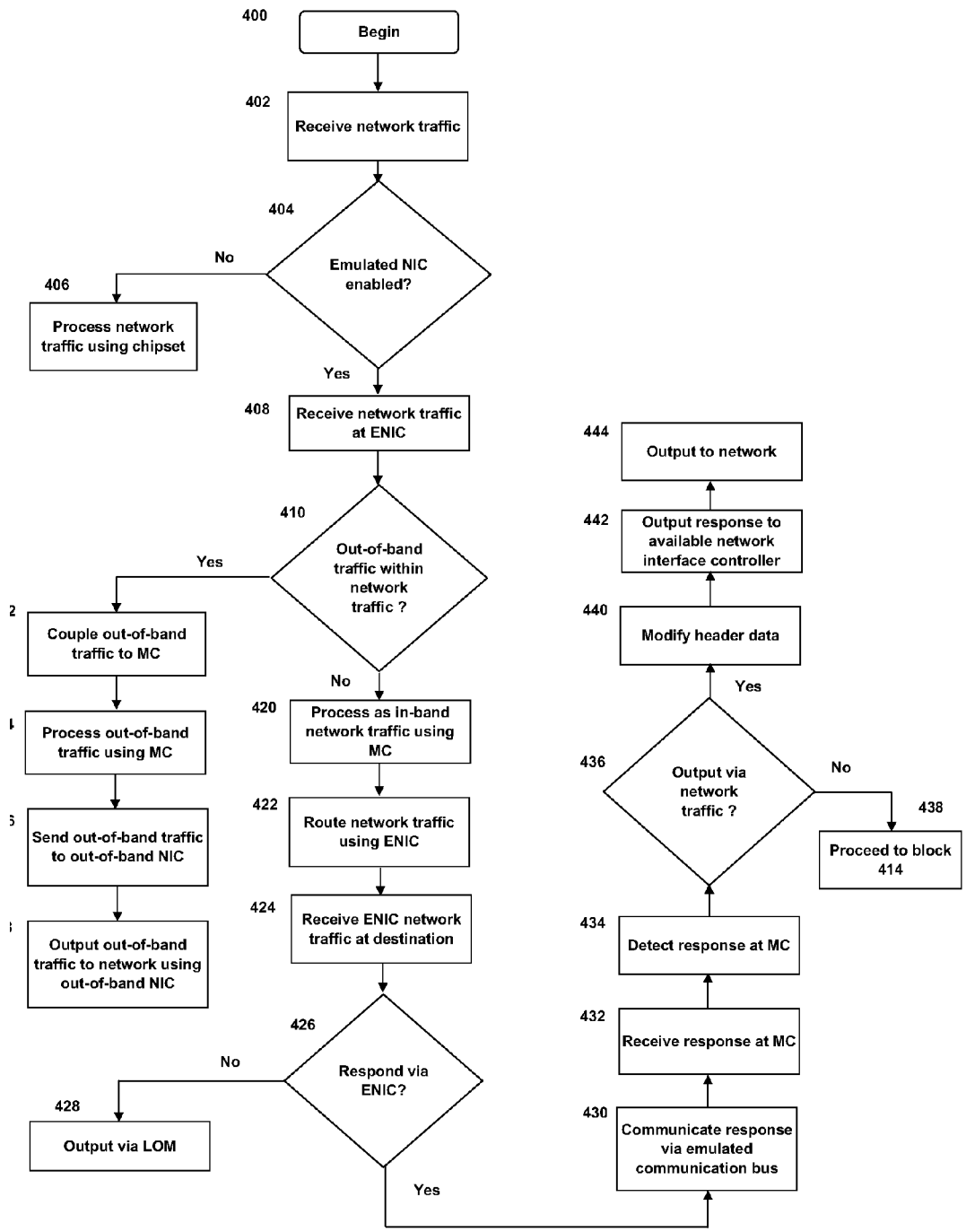
FIG. 4 illustrates a flow diagram of using an emulated network interface controller within an information handling system according to one aspect of the disclosure.

FIG. 4 illustrates a flow diagram of using an emulated network interface controller within an information handling system according to one aspect of the disclosure. FIG. 4 can be employed in whole, or in part, by the information handling system 100 depicted in FIG. 1, the information handling system 300 described in FIG. 3, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions of, the method of FIG. 4.

The method begins generally at block 400. At block 402, network traffic can be received via a NIC, LOM, of other form of network interface communication device. Upon receiving network traffic, the method can proceed to decision block 404 and determines if an emulated NIC (ENIC) can be used to communicate the network traffic. If at decision block 404, an ENIC may not be available, the method can proceed to block 406 and the network traffic can be processed, filtered, routed, etc. using the host chipset as desired. If at decision block 404, an ENIC may be enabled, the method can proceed to block 408, and network traffic can be received at the ENIC. The method can then proceed to decision block 410, and if out-of-band traffic is detected within the network traffic, the method can proceed to block 412, and the out-of-band traffic can be coupled to the management controller. The method can then proceed to block 414 and the out-of-band traffic can proceed using the management controller as desired. In one form, the method can proceed to block 416 as a response can be output, and the response can be formulated and coupled to an out-of-band NIC. The method can then proceed to block 418, and the out-of-band NIC can output the out-of-band traffic.

If at decision block 410, out-of-band traffic is not detected, the method can proceed to block 420, and the network traffic can be processed by the MC, if desired, as in-band network traffic. The method can then proceed to block 422, and the network traffic can be routed using the ENIC to the chipset or other destination of the host system operable to receive the network traffic via the ENIC. The method can then proceed to block 424, and the network traffic can be received at the destination. The method can then proceed to decision block 426, and determines if a response may be formulated via the ENIC. If at decision block 426, a response may not be formulated using the ENIC, the method can proceed to block 428, and a response can be output using the LOM, NIC or other communication device.

If at decision block 426, a response is to be sent via the ENIC, the method can proceed to block 430, and the response can be communicated to the MC via the ENIC. The method can then proceed to block 432, and the response can be received at the MC via the ENIC. The method can then proceed to block 434, and the MC can detect a response at the MC, and to decision block 436, and the method can determine if the response should be output as out-of-band network traffic. If the response should be output as out-of-band network traffic, the method can proceed to block 438, and to block 414 as described above. If at decision block 436, the response should be output as in-band network traffic, the method can proceed to block 440, and the address data can be modified to include address information of the ENIC as desired. The method can then proceed to block 442, and the response can be output to a LOM or other NIC of the information handling system. The method can then proceed to block 444, and the response can be output to the network within the network traffic. In one form, a response can be output via the in-band network traffic using the ENIC as desired.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a host chipset operably coupled to a first network interface controller of a first main circuit board;
   a management controller operably coupled to the host chipset, the management controller including a baseboard management controller;
   an emulated network interface controller operable to be activated by the management controller when the management controller determines that the first network interface controller is out of service, wherein the baseboard management controller is configured to filter and proxy network traffic through the emulated network interface controller; and
   a communication bus coupled to the host chipset and the management controller,
   wherein the communication bus is operable to activate a communication link between the host chipset and the emulated network interface controller:
   wherein the first network interface controller is an out of band interface controller.

2. The information handling system of claim 1, wherein the first network controller is an out of band interface controller, and wherein the management controller is configured to be accessed externally through a public network via the emulated network interface controller to determine various operating conditions of the information handling system.

3. The information handling system of claim 2, further comprising:
   a first shared network interface controller operable to receive a network traffic including an address of the emulated network interface controller; and
   wherein the management controller is further operable to route the network traffic using the address.

4. The information handling system of claim 3, wherein the management controller further comprises:
   a management controller link interface coupled to the host chipset; and
   a communication hub operable to:
     detect out-of-band traffic within the network traffic;
     detect in-band traffic within the network traffic;
     route the in-band network traffic to the emulated network interface controller; and
     route the out-of-band network traffic to the management controller link interface.

5. The information handling system of claim 2, further comprising:
wherein the communication bus includes a plug and play communication bus; and
wherein the emulated network interface controller can be activated without reinitializing a host system of the host chipset.

6. The information handling system of claim 2, further comprising:
an out-of-band network interface controller communicatively coupled to the management controller;
wherein the out-of-band network interface controller is operable to receive out-of-band network traffic; and
wherein the management controller is operable to route the out-of-band network traffic from the output-of-band network interface controller to the host chipset using the communication link.

7. The information handling system of claim 2, further comprising:
a second network interface controller coupled to the host chipset and the management controller; and
wherein the management controller is operable to route network traffic received by the second network interface controller to the host chipset using the emulated network interface controller.

8. The information handling system of claim 2, further comprising:
a host chipset network interface controller coupled to the communication bus; and
wherein the emulated network interface controller is operable to be coupled to the host chipset network controller interface via the communication bus.

9. The information handling system of claim 2, further comprising:
wherein the emulated network communication interface is operable to use a first communication bus protocol;
wherein the first network interface controller is coupled to the host chipset using a second communication bus operable to use a second communication bus protocol; and
wherein the first communication bus protocol is different from the second communication bus protocol.

10. A method of enabling communication within an information handling system, comprising:
determining that an out-of-band network controller is out of service;
emulating a network interface controller using a management controller when the out-of-band network controller is out of service;
filtering, by a baseboard management controller of the management controller, network traffic for the management controller;
proxying, by the baseboard management controller, the network traffic through the emulated network interface controller;
receiving a network communication using the emulated network interface controller;
determining an available communication bus between a host chipset and the management controller;
initiating activation of a communication interface using the available communication bus;
enabling communication of network traffic between the host chipset and the management controller using the emulated interface controller and the available communication bus.

11. The method of claim 10, wherein the first network controller is an out of band interface controller, and wherein the management controller is configured to be accessed externally through a public network via the emulated network interface controller to determine various operating conditions of the information handling system.

12. The method of claim 10, further comprising:
receiving the network traffic at the emulated network interface controller;
determining an out-of-band network traffic within the network traffic;
routing out-of-band network traffic to the management controller; and
routing an in-band network traffic within the network traffic to the host chipset using the emulated network interface controller.

13. The method of claim 10, further comprising:
receiving the network traffic at a first network interface controller;
determining an address within the network traffic of the emulated network interface controller; and
routing the network traffic received at the first network interface controller to the emulated network interface controller.

14. The method of claim 10, further comprising:
receiving a request to enable the emulated network interface controller from a remote client;
initiating use of the emulated network interface controller in response to the request; and
enabling access to the management controller via the network traffic of the remote client.

15. The method of claim 14, further comprising:
presenting a web page operable to initiate use of the emulated network interface controller; and
receiving the request to enable the emulated communication interface via the web page.

16. The method of claim 13, further comprising:
receiving a request to access a resource of the management controller using network traffic received by a first communication interface;
routing the network traffic including the request to the emulated communication interface; and
enabling access to the management controller upon receipt of the access request.

17. The method of claim 13, further comprising:
receiving a request to initialize the emulated communication interface; and
enabling use of the emulated communication interface without reinitializing a host system operably coupled to the management controller.

18. An information handling system comprising:
a host chipset operably coupled to a management controller of a first main circuit board;
an emulated network interface controller operable to be activated by the management controller when an out-of-band network controller is out of service, wherein the management controller is configured to be accessed externally through a public network via the emulated network interface controller to determine various operating conditions of the information handling system;
a communication bus coupled to the host chipset and the management controller, wherein the communication bus is operable to activate a communication link between the host chipset and the emulated network interface controller;
a first local area network interface controller coupled to the management controller and the host chipset; and
a second local area network interface controller coupled to the management controller and the host chipset, wherein the emulated network interface controller is further operable to communicate network traffic received by the first local area network interface controller and the second local area network interface controller to the host chipset.

19. The information handling system of claim 18, further comprising:
   wherein the first network interface controller is operable to communicate with the host chipset using a first communication bus protocol;
   wherein the second network interface controller is operable to communicate with the host chipset using the first communication bus protocol; and
   wherein the emulated network communication interface is operable to communicate with the host chipset using a second communication bus protocol, wherein the second communication bus protocol is different than the first communication bus protocol.

20. The information handling system of claim 19, further comprising:
   wherein the first communication bus protocol includes a PCI enabled protocol; and
   wherein the second communication bus protocol include a USB enabled protocol.

* * * * *